United States Patent
Ouellette (10) Patent No.: US 6,983,943 B2
(45) Date of Patent: Jan. 10, 2006

(54) CONVERTIBLE SKI-SUPPORTED VEHICLE

(76) Inventor: Michael J. Ouellette, P.O. Box 34, Caribou, ME (US) 04736

( * ) Notice: Subject to any disclaimer, the term of this patent is extended or adjusted under 35 U.S.C. 154(b) by 0 days.

(21) Appl. No.: 10/658,624

(22) Filed: Sep. 9, 2003

(65) Prior Publication Data

US 2004/0046338 A1    Mar. 11, 2004

Related U.S. Application Data

(63) Continuation-in-part of application No. 10/352,302, filed on Jan. 27, 2003, now Pat. No. 6,824,147, and a continuation-in-part of application No. 10/233,718, filed on Sep. 3, 2002, now abandoned, and a continuation-in-part of application No. 09/818,058, filed on Mar. 26, 2001, now Pat. No. 6,527,282.

(51) Int. Cl.
*B62D 57/00* (2006.01)
(52) U.S. Cl. .................................. 280/28; 280/8; 280/9
(58) Field of Classification Search ............... 280/7.14, 280/28, 43.23, 43.24, 8–12, 43.14, 43.22, 280/767, 30, 7.12
See application file for complete search history.

(56) References Cited

U.S. PATENT DOCUMENTS

| | | | | |
|---|---|---|---|---|
| 1,308,937 A | * | 7/1919 | Crane | 180/183 |
| 3,477,734 A | * | 11/1969 | Albertson | 280/11 |
| 3,552,515 A | * | 1/1971 | Tomita | 180/184 |
| 3,570,617 A | * | 3/1971 | O'Day | 180/184 |
| 3,643,978 A | * | 2/1972 | Westberg | 280/28 |
| 3,696,877 A | * | 10/1972 | Dessureault | 180/184 |
| 3,709,512 A | * | 1/1973 | Albertson | 280/28 |
| 3,726,354 A | * | 4/1973 | LaPlante | 280/21.1 |
| 3,777,829 A | * | 12/1973 | Rogers | 180/184 |
| 3,942,812 A | * | 3/1976 | Kozlow | 280/28 |
| 4,390,151 A | * | 6/1983 | Schneider | 244/108 |
| 5,165,709 A | * | 11/1992 | Jacques | 280/28 |
| 5,439,237 A | * | 8/1995 | Kutchie | 280/28 |
| 5,802,887 A | * | 9/1998 | Beland | 70/14 |
| 6,012,728 A | * | 1/2000 | Noble | 280/28 |
| 6,102,413 A | * | 8/2000 | Khennache et al. | 280/28 |
| 6,267,392 B1 | * | 7/2001 | Noble | 280/28 |
| 6,520,512 B1 | * | 2/2003 | Lachance | 280/28 |
| D473,163 S | * | 4/2003 | Mallette et al. | D12/7 |
| 2004/0061296 A1 | * | 4/2004 | Metheny | 280/28 |

* cited by examiner

*Primary Examiner*—J. Allen Shriver
(74) *Attorney, Agent, or Firm*—Patricia M. Mathers; Thomas L. Bohan (57) ABSTRACT

Mounting bracket for mounting a wheel unit or other device on the ski of a snowmobile. A base plate of the mounting bracket attaches to the bottom of the ski with the same fastener that fastens a carbide runner to the bottom of the ski. A mounting section has mounting holes or brackets and extends along the outside of the side wall of the ski. The wheel unit is affixable to the mounting bracket, making it easier to retrofit a wheel unit onto a ski having carbide-runner posts in the bottom of the ski.

9 Claims, 10 Drawing Sheets

CONVERTIBLE SKI-SUPPORTED VEHICLE

CROSS-REFERENCE TO RELATED APPLICATIONS

This application is a Continuation-in-Part (CIP) of U.S. patent application Ser. No. 10/352,302, filed Jan. 27, 2003, now U.S. Pat. No. 6,824,147 B2, and claims priority under 35 U.S.C. § 120 from that application, from previously filed CIP application Ser. No. 10/233,718, filed Sep. 3, 2002 now abandoned, and from application Ser. No. 09/818,058, filed Mar. 26, 2001 and issued as U.S. Pat. No. 6,527,282 B1.

BACKGROUND INFORMATION

1. Field of the Invention

The invention relates to the field of ski-supported vehicles. More particularly, the invention relates to snowmobiles equipped with wheels that will allow the snowmobile to travel readily over surfaces not covered with snow or ice.

2. Description of the Prior Art

Snowmobiles are vehicles that are constructed to travel across snow and ice. As is generally known, the snowmobile is driven by an endless drive track arranged at the rear end of the underside of the snowmobile. The front end of the snowmobile is supported and rides along two skis, which glide across the surface of the snow or ice. The skis typically have a carbide runner that runs along a portion of the bottom surface of the ski, to help keep the snowmobile traveling along a smooth track.

A disadvantage of snowmobiles is that the skis don't readily glide across gravel, hardtop, or other non-snow surfaces. This makes it difficult, if not impossible, to steer a snowmobile because the skis do not respond properly to the steering operations initiated at the handlebars. Quite often, the snowmobile needs to be dragged or pushed in driveways and across roadways, etc. Furthermore, when a snowmobile is driven or dragged across a non-snow surface, the carbide runners on the skis are subject to excessive wear and must be replaced more frequently, depending on how often a snowmobile travels across a non-snow surface. This inability to steer snowmobiles on surfaces other than snow and ice makes it difficult for people to maneuver their snowmobiles across roadways, driveways, onto ferries, etc.

In recent years, the sport of snowmobiling has changed evolved from one of traveling relatively short distances over trails close to home to one of weekend-long or longer cross-country trips. Previously, for example, a snowmobile operator would fill the gasoline tank of the snowmobile in his or her backyard, transport the snowmobile to a trail site or depart directly from the backyard for an afternoon or day of travel over snowmobile club trails, and then return home. Nowadays, people are traveling great distances across country on snowmobiles that involve two- or three-day tours or even such mammoth tours as from Alaska to Maine.

This development of the sport of snowmobiling into extended trips means that snowmobiles must now be refilled with gasoline and maintained while they are out traveling across open country. Thus, where in the past the tank on the snowmobile was filled at home or at the point of departure before a daylong excursion, snowmobiles now need to be refilled while out traveling. This means that the snowmobile must be driven to a service station, typically by traveling some distance along a road surface other than snow or ice. Also, now that such lengthy trips are being undertaken with snowmobiles, the presence of snow along the entire route is not guaranteed, and consequently, snowmobiles are being required more and more frequently to travel some distance across surfaces other than snow or ice. Before, when a snowmobile needed to be dragged or pushed only a short distance across a roadway or driveway, or up a ramp onto a ferry, it was possible for a person to do it alone or with the assistance of a traveling companion. Now, however, with the need to travel several miles along a roadway to get to a filling station, the inability to steer a snowmobile has become a major obstacle in the logistics and the enjoyment of the sport.

Efforts to make snowmobiles mobile on gravel or other surfaces have been undertaken over the years. Prior art includes conversion kits to replace the skis with wheels. These conversion kits were intended to replace the skis on a semi-permanent basis, that is, to convert a snowmobile into a wheeled vehicle for an extended period of time. Such conversion kits typically require that the ski be removed in order to mount the wheels, or, if the ski does remain attached to the vehicle, a longer kingpin must be used to mount the wheels. Thus, each time the wheels are mounted or removed, the kingpin must be replaced with the longer or shorter one, respectively. Both methods of converting the snowmobile to a wheeled vehicle involve a fair amount of work. Thus, such conversion kits are not generally an acceptable solution to the problem of having to change in relatively quick succession back and forth between a vehicle that rides on skis and one that rides on wheels, as happens when traveling over gravel or hardtop or other surface other than snow or ice to fill the gas tank or to load onto a ferry.

What is needed, therefore, are means for quickly converting a vehicle back and forth between one that glides on skis to one that rolls on wheels. What is further needed are such means that do not impair the steerability of the vehicle. What is yet further needed are such means that are easily implemented, without requiring great physical strength and without requiring the use of tools. What is still yet further needed are such means that are retrofittable on any conventional snowmobile ski.

SUMMARY OF THE INVENTION

An object of the present invention is to provide a combination ski-wheel unit that will allow one to convert a ski-supported vehicle quickly and easily to a wheeled vehicle and back to a ski-supported vehicle, without requiring the use of tools. Another object of the present invention is to provide such a unit that will maintain the steerability of the vehicle, whether on skis or on wheels. A further object is to provide such a unit that, once installed, can be easily deployed without requiring great physical strength. Still another object is to provide a wheel kit with deployable wheels that can be retrofitted onto any conventional snowmobile ski.

The objects are achieved by providing a road wheel unit having one or more wheels that is permanently or semi-permanently installed on the ski of a conventional snowmobile so as to provide easily deployable or retractable wheels, as the conditions require. In a retracted position, i.e. the standard snowmobile mode of operation, the wheel is carried alongside the ski, raised above the gliding surface of the ski. In a deployed position, the wheel is lowered, so that the weight of the machine is supported by the wheel. In this deployed position, the wheel unit holds the ski above the rolling surface of the wheel and allows the snowmobile to ride on wheels and the conventional endless track at the rear end. In the deployed mode, the snowmobile remains readily steerable with the handlebars, and the carbide runners on the ski surfaces are not subject to excessive wear. Ideally, the wheel or wheels of the wheel unit are easily detachable from the mounting means, leaving the mounting means permanently installed on the vehicle, without impairing the functionality of the skis. As mentioned above, a wheel unit has one or more wheels. Generally, at least one wheel is mounted on each of the two skis of the snowmobile and, thus, the term "wheels" is generally used hereinafter, although it is understood that, depending on the type of wheel unit, only one wheel may be mounted on a ski.

There are various types of conventional skis. Some have a kingpin assembly for linking the ski to the snowmobile; other skis have built-up side walls and/or a saddle-shape protrusion extending from the side wall that is constructed with sufficient strength and rigidity to support a linking assembly that links the ski to the snowmobile. The scope of the invention includes a wheel unit that is mountable on the kingpin that links the ski to the snowmobile, as well as a wheel unit that is mountable on the side wall or the saddle of the ski, or onto a mounting block that is integrated into the side wall construction of the ski. The wheel unit mountable on the kingpin is hereinafter referred to as the kingpin-mount wheel unit; the unit mountable on the side wall, saddle, or onto a mounting block integrated into the side wall construction is referred to as the side wall-mount wheel unit; and a unit that is mountable on virtually any type of ski, that is, on a kingpin assembly, on a side wall or saddle is referred to as the universal wheel unit.

Each wheel unit includes one or two wheels and a deployment mechanism that allows the wheels to be deployed or retracted. When a pair of wheels is mounted on one ski, i.e., one wheel on each outer side of the ski, the deployment mechanism ideally simultaneously deploys the wheel on both sides of the ski.

The deployment mechanism is ideally a relatively simple mechanical shifting and locking mechanism that allows the operator to easily shift the wheel unit between a deployed wheel position and a retracted wheel position and to securely lock the wheel unit in the respective position. One deployment mechanism that is suitable includes a side rail that is shiftably attached to the wheel unit and a latching mechanism for latching the wheel unit into a first or deployed position and into a second or retracted position. For example, a latch is mounted on the ski or on the wheel unit and the wheel unit locked into position by catching the latch in the first position or in the second position on the rail. The first and second position may be connected by a groove and the latch itself may be a pin that is captured at one end in the groove and is slidably movable into the first position or into the second position, where it is secured against unintentional release.

Another suitable deployment mechanisms for securing the wheel unit has at least two latch bores, depressions, or latch-receiving assemblies that are provided on the ski, either on the side wall or on a rail attached to the ski or attached to the wheel unit. Each of the latch bores, etc. corresponds to a particular position of the wheel unit. Thus, a first position corresponds to a position state and a second position to a retracted position of the wheel unit. A latch that is mounted on the wheel unit is securable in one or the other latch bores. For example, a handle with a spring-loaded button or bar is pivotably attached to the wheel unit. The wheel unit is secured in the deployed or retracted position by pulling on the handle to release the button from the respective latch bore, moving the handle to the desired position and allowing the button or bar to snap into the respective other latch bore.

Generally, the deployment mechanism incorporates a locking mechanism for locking the wheel unit into position, as described above. It is possible, however, to provide a separate locking mechanism in the ski to ensure that the wheel unit is locked into the respective deployed-wheel or retracted-wheel position. In an embodiment in which two wheels are mounted on a ski, a side rail is pivotably mounted each side of the ski and a yoke used to connect to each side rail to gang them together. A latching mechanism is mounted on the floor of the ski. The yoke depends down into the inner contour of the ski and the bottom portion of the yoke latches into the latching mechanism.

It is important that the wheel unit be easily deployable by a person of average strength. To deploy the wheel unit having a deployment mechanism that includes a side rail and latching pin, the operator lifts the ski by the handle that is typically provided at the front end of the ski, grabs hold of the crossbar (if two side rails are ganged with a crossbar) or the latching pin, and slightly lifts and slides the crossbar or the latching pin forward toward the front end of the ski until the it latches in the first or deployed position. This effectively lowers the wheel or wheels and locks the wheel unit into place. The snowmobile is now drivable across gravel and hardtop surfaces without losing its ability to be steered with the handlebars. To retract the wheels, the procedure is reversed. The operator lifts the ski until the weight of the snowmobile is off the wheels, grabs the crossbar or latching pin and slides it toward the rear end of the ski until it latches in the second or retracted position. The wheel or wheels are now secured in a raised or retracted position in which the lowest point of the wheels is above the gliding surface of the ski, allowing the snowmobile to glide fully on the skis.

In some cases, it is desirable or necessary to mount the wheel unit on the side wall or saddle of the ski, rather than on a kingpin. The side wall-mount wheel unit is provided for this purpose. The side wall-mount wheel unit includes a mounting plate that is mountable on the side wall or on the saddle. The wheel-mounting bracket is mounted on a spindle that extends from the mounting plate. As with the kingpin-mount wheel unit, either one wheel or a pair of wheels is mounted on each ski. Again, if a pair of wheels is mounted on the ski, a crossbar or some other means is ideally used to gang or link the two side rails, so that moving the deployment mechanism causes both side rails to move simultaneously, thereby ensuring that the wheels are deployed/retracted simultaneously.

A universal wheel unit according to the invention is provided that is mountable on virtually any conventional ski. The universal wheel unit is mountable on a kingpin mount, on the side wall, or on the saddle of a ski and is particularly well-suited for mounting a single wheel, rather than a pair of wheels, on a ski. The universal wheel unit may also be affixed to the ski by means of the fasteners that are used to attach conventional carbide runners to the bottom of the ski. A mounting bracket is also provided for use with a ski in which the carbide runner is attached to the ski with a fastener that passes through the bottom of the ski. In this case, the mounting bracket is fastened to the inner surface of the bottom of the ski, using a fastener that also affixes the carbide runner to the outer surface of the bottom of the ski. The mounting bracket wraps up around the side wall of the ski and provides a mounting surface on the outside of the side wall to which the universal wheel unit may be affixed.

It is within the scope of this invention to include an automatically actuatable wheel unit for ski-mounted vehicles. The deployment mechanisms described above involve simple mechanical actuation. Any number of known automated or power-assisted means of actuating a cam mechanism are suitable for deploying and retracting the wheels. In one embodiment, the latching mechanism is spring-biased toward the retracted position, so that, when the snowmobile weight is lifted from the ski, the wheel unit automatically shifts to a "retracted" position. Other means for actuating the deployment mechanism according to the invention include such means as a pivot arm or linkage driven by an electric motor, an electromagnetic means in which magnets are selectively magnetized to draw the deployment mechanism to a deployed or retracted position, or hydraulic or pneumatic means. A small electric motor is mountable within the inner contour of the ski, for example, and then wired to a thumb switch on the handlebar of the snowmobile. The motor drives a shaft that is connected to an arm that is pivotably linked to the side rail or frame. When the shaft extends, the deployment mechanism is pushed to a deployed position, thereby lowering the wheels to an operable level, and when the shaft retracts, it pulls the deployment mechanism to a retracted position, thereby lifting the wheels above the level of the gliding surface of the ski. An indicator, for example, a warning light, connected either to the deployment mechanism or the power-assisted actuating means, may be mounted on the dashboard or on the handlebar to alert the operator when the wheel unit is deployed.

Although it is desirable that snowmobiles be sold already equipped with skis having a wheel unit according to the present invention, a wheel kit is provided for retrofitting a typical ski for any number of the conventional snowmobiles already available. In most cases, the ski itself need not be modified. When retrofitting a ski with a kingpin link to receive the kingpin-mount wheel unit, the original kingpin may need to be replaced with a modified, longer kingpin, to which the kingpin-mount wheel unit is then attached. When retrofitting a ski that does not have a suitable kingpin mounting assembly, or if a side-wall mounting is desired for other reasons, a mounting bracket is provided. Various mounting brackets are provided, depending on the type of ski and on the availability of carbide runner fasteners. A side wall-unit mounting bracket is provided for mounting the wheel-unit over the double-scag fastening posts or to the side wall or saddle of the ski. A ski-bottom mounting bracket is also provided for skis that have a carbide runner attached to the bottom of the ski. This bracket is secured to the bottom of the ski by means of the fastener for securing the carbide runner to the bottom of the ski. The wheel deployment mechanism and wheel assembly are then mounted on the bracket on the outside side-wall of the ski. Depending on the type of ski, the universal wheel unit is mountable on the modified kingpin, on the side wall, over the double-scag fastening posts, or on the saddle of the ski. Regardless of which type of actuation means is installed, manual, electric, or other, a switch and/or an indicator light is retrofittable on the dash of the snowmobile.

With the wheel unit according to the invention, one or two wheels are semi-permanently mounted on the ski. Depending on the particular travel conditions, the wheels are retracted and carried along side the ski in a raised position, above the gliding surface of the ski or are deployed to convert the snowmobile to a wheeled vehicle.

DETAILED DESCRIPTION OF EMBODIMENTS OF THE INVENTION

Figure 1:
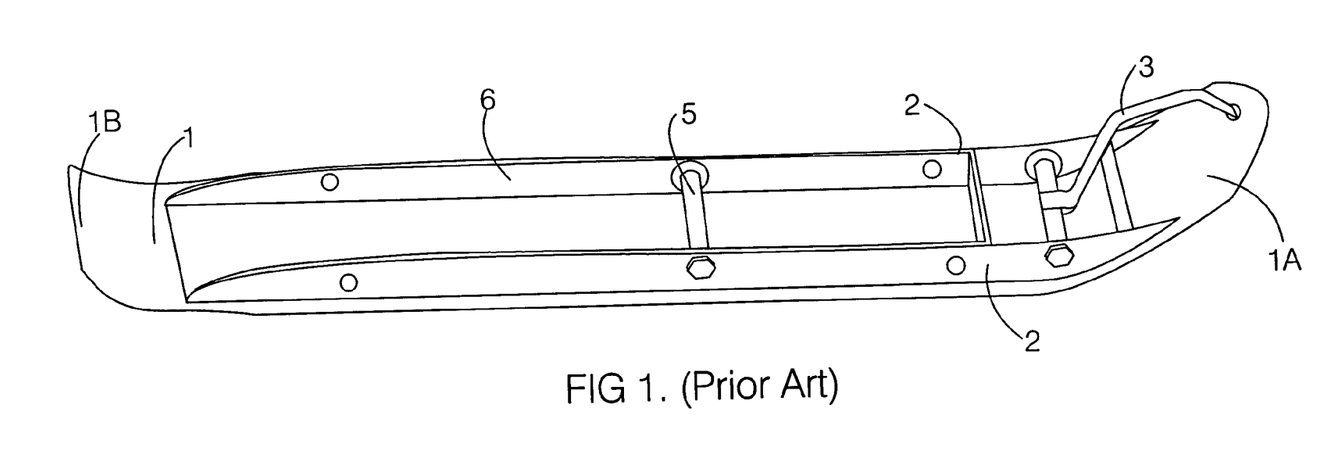
FIG. 1 shows a perspective view of a conventional snowmobile ski (prior art).

FIG. 1 shows a conventional snowmobile ski comprising a ski 1 having ski sides 2, a lifting handle 3 disposed at a front end 1A of the ski, and a reinforcing liner 6. A kingpin 5 is mounted in the ski 1. With the particular ski shown, a spindle (not shown) mounts on the kingpin 5 to attach the ski 1 to the snowmobile. The present invention is a wheel unit that is mountable on the ski 1, and is either directly mountable on the kingpin 5 or on a side 2 of the ski 1. It is noted here that a reference designation assigned to a particular element of the invention is maintained hereinafter throughout the description, even if the element is used in more than one embodiment of the invention.

Figure 2:
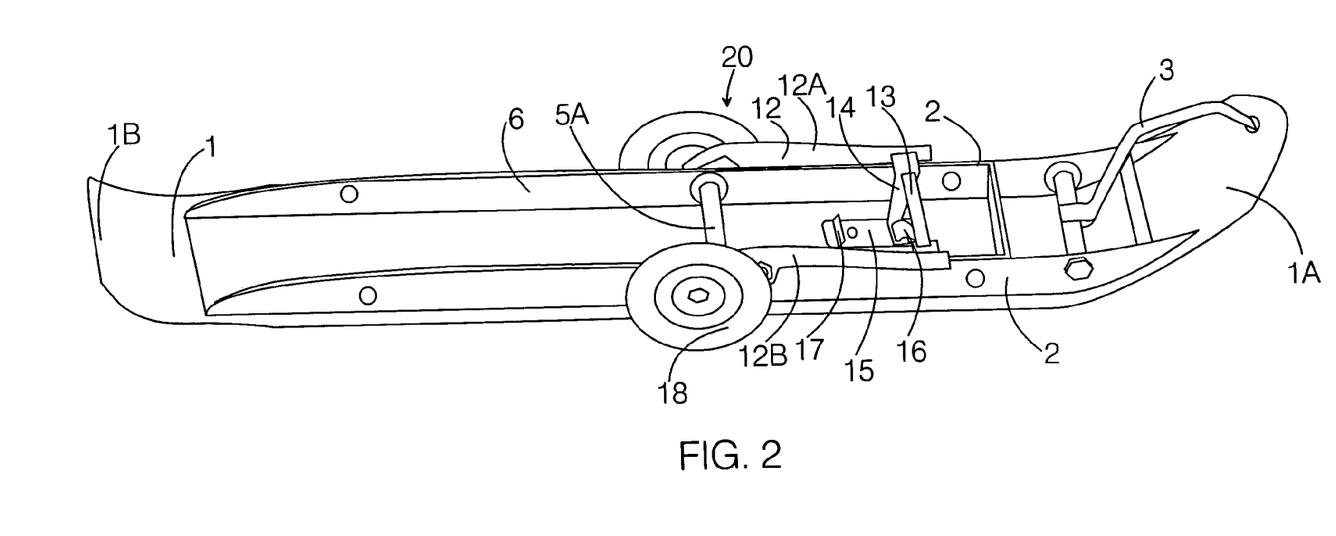
FIG. 2 is a perspective view of a portion of a ski, showing a first embodiment of the kingpin-mounted wheel unit according to the invention, and the deployment mechanism.

FIG. 2 shows an embodiment of a kingpin-mounted wheel unit 20 according to the invention that has been assembled on the ski 1. As shown in this FIG. 2, the wheel unit 20 is in a deployed position. The wheel unit 20 comprises a deployment mechanism that includes a movable frame 12 formed by two side rails 12A,12B, a cross-bar 13 and a yoke 14, a modified kingpin 5A, a wheel mounting bracket 21, and a pair of wheels 18. Mounted in the bottom of the ski 1 is a latching means 15. In this embodiment, the latching means 15 comprises a simple latch 16 and a stop plate 17. The movable frame 12 has been moved to a deployed position and the yoke 14 is held by the latch 16.

Figure 3:
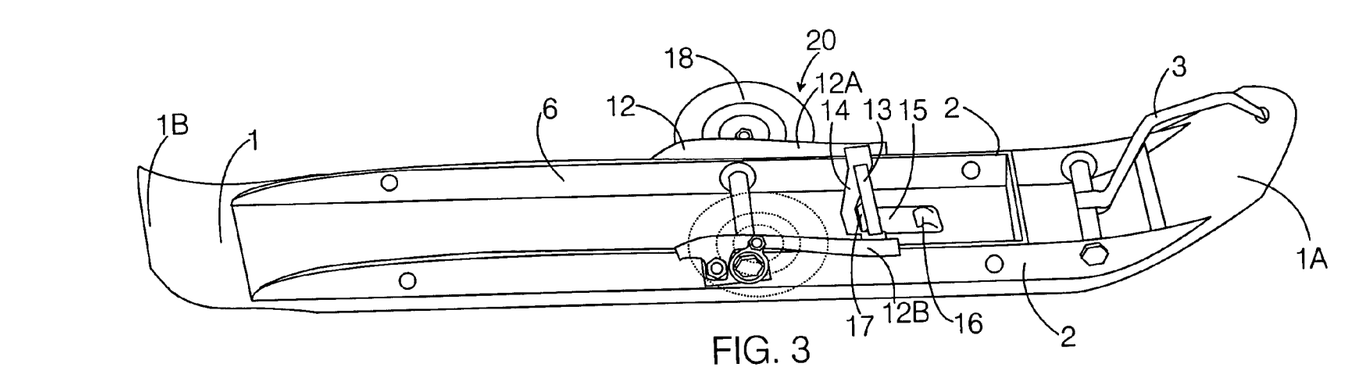
FIG. 3 is a perspective view of a ski according to the invention, showing the wheel unit of FIG. 2 in a retracted position, with the movable frame and a latching mechanism.
Figure 4:
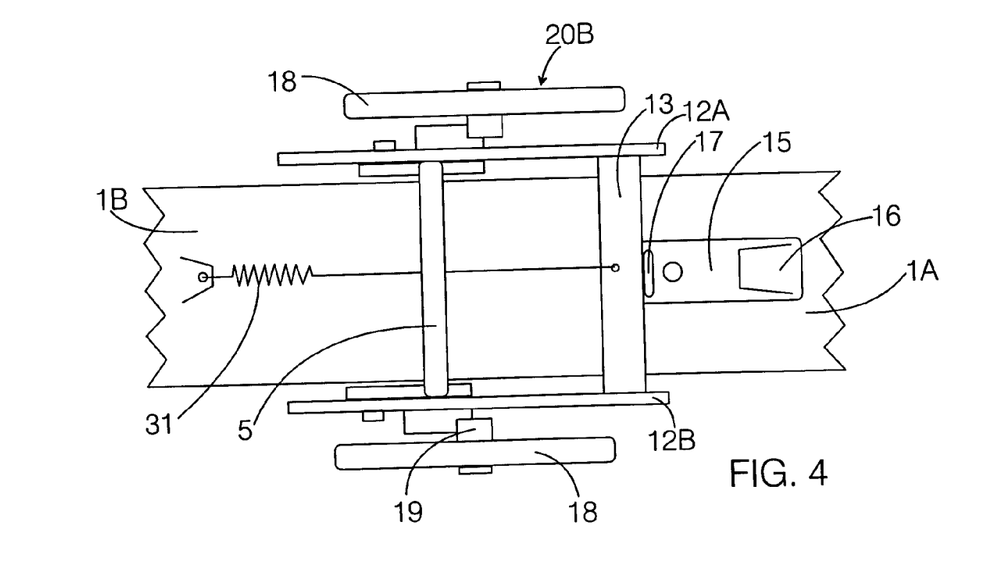
FIG. 4 shows a spring-biased movable frame according to the invention.

FIG. 3 shows the wheel unit 20 in a retracted position. As can be seen, the movable frame 12 has been shifted toward a rear end 1B of the ski 1 and the yoke 14 is held in position by the stop plate 17. This embodiment is a basic mechanical embodiment of the wheel unit 20 that can be deployed manually by a snowmobile operator. To deploy the wheel unit 20 from the retracted position shown in FIG. 3, the snowmobile operator merely lifts up on the ski handle 3 with one hand, grabs the crossbar 13 with the other hand and pushes it toward a front end 1A of the ski 20 until the yoke 14 catches under the latch 16 on the latching means 15.

Figure 5:
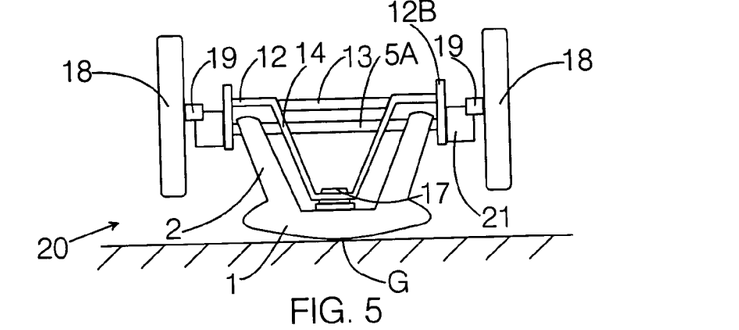
FIG. 5 shows a cross-section of the wheel unit of FIG. 2, showing the movable frame within the ski profile and a motor.
Figure 6:
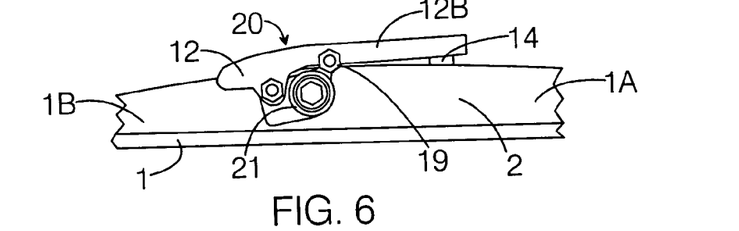
FIG. 6 shows in detail the wheel mount on the modified kingpin according to the invention.
Figure 7:
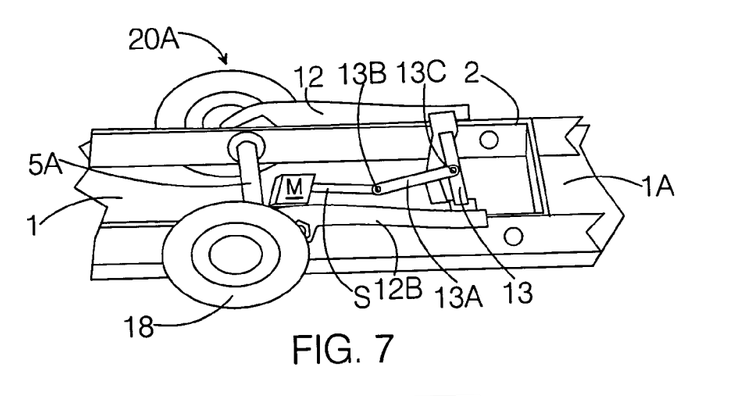
FIG. 7 is a perspective view of a motorized wheel unit according to the invention.
Figure 8:
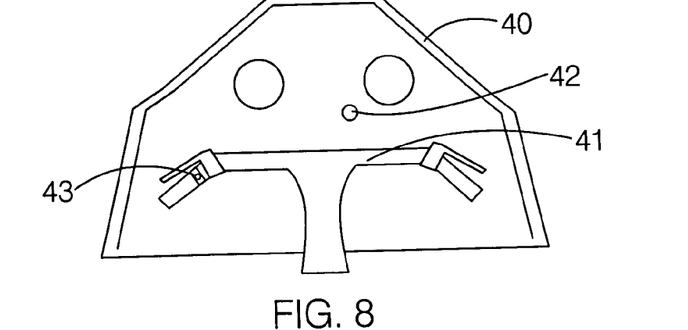
FIG. 8 is a partial view of a dashboard of a snowmobile, illustrating the thumb switch to actuate the wheel unit according to the invention, and an indicator light to indicate that the wheels are deployed.

FIG. 5 shows a cross-section of the ski 1 with the wheel unit 20, looking from the rear toward the front of the ski 1. The movable frame 12 is mounted on the ends of a modified kingpin 5A that extend to the outer side of the sides 2 of the ski 1. The kingpin 5A is longer than the conventional kingpin 5 to allow the movable frame to be mounted on each of the kingpin 5A on the outside of each of the ski sides 2. A cam or wheel-mounting bracket 21 is attached to each end of the kingpin 5A. Mounted eccentrically on each wheel-mounting bracket 21 is a wheel mount spindle 19 for mounting the pair of wheels 18. Due to the eccentricity of the mount, the wheels 18 are in a deployed position when the frame 12 is moved into the deployed position toward the front end 1A of the ski 1 and are in a retracted position when the frame 12 is moved toward the rear end 1B of the ski 1.

As shown in FIG. 3, the yoke 14 is positioned behind the stop plate 17, with reference to the front end of the ski 1, and the wheel unit 20 is in a retracted position. As can be seen, the lowest point of each wheel 18 is raised above the gliding surface G of the ski 1.

Figure 9:
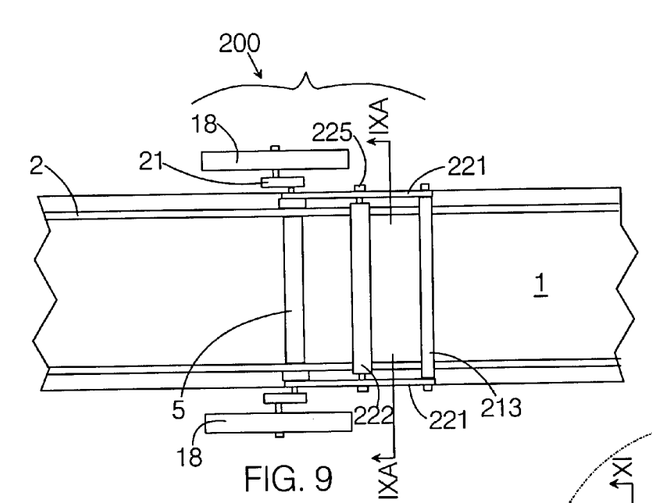
FIG. 9 shows a second embodiment of the kingpin-mounted wheel unit according to the invention.
Figure 9A:
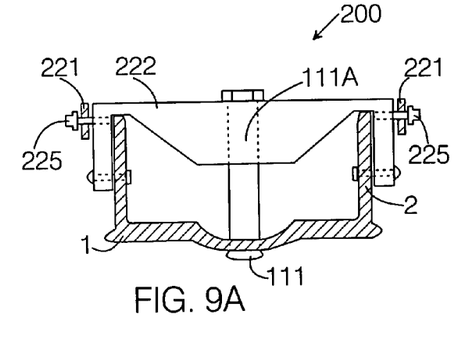
Figure 10:
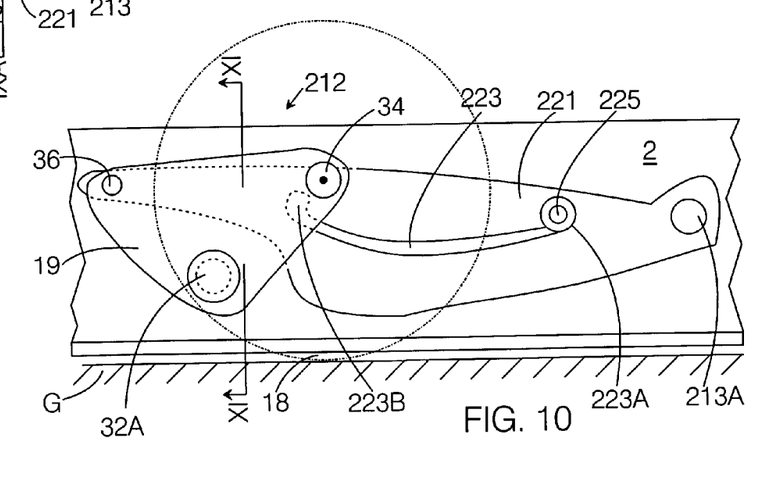
FIG. 10 is a side view of the deployment mechanism of the wheel unit of FIG. 9, showing the side rail and the wheel-mounting bracket.

FIGS. 9, and 9A, 10 show a second embodiment of the kingpin-mountable wheel unit 200, mounted on the kingpin 5 of the ski 1. This second embodiment is very similar to the first embodiment with regard to the way the wheels 18 are mounted eccentrically on the cam or wheel-mounting bracket 21 on the ski 1, but has a modified deployment mechanism 212 that includes two side rails 221, an anchor bar 222, and a crossbar 213 that is connected at a connection point 213A to an actuating end 221A of each of the respective side rails 221. FIG. 9 is a top planar view of the wheel unit 200 and FIG. 9A is a partial cross-sectional view of the ski 1 that shows the anchor bar 222 in greater detail. The wheel-mounting bracket 21 and wheel 18 are not shown in FIG. 9A. The anchor bar 222 is fixedly mounted on the ski 1 forward of the kingpin 5 and has a locking pin 225 that extends from each end of the anchor bar 222 outwardly from the respective side 2 of the ski 1. Although the anchor bar 222 can be mounted by any conventional means to the ski 1, it is practical with skis that have a carbide runner 111 attached to the bottom of the ski 1 to provide a through-bore in the anchor bar 222 and to use a fastener 111A as shown for attaching both the carbide runner 111 and the anchor bar 222 to the ski 1.

Figure 11:
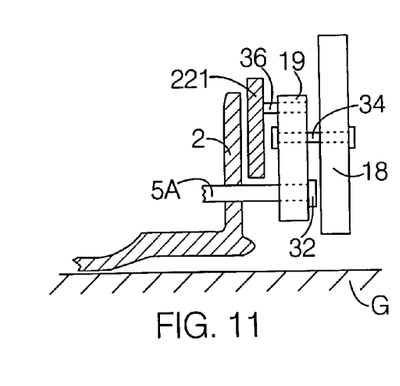
FIG. 11 is a cross-sectional view of the wheel unit of FIG. 9, showing the connections between the wheel-mounting bracket, the side rail, and the kingpin.

See FIG. 10 for a side view of a portion of the ski 1, showing the side wall 2, the wheel 18, and the side rail 221. A curved groove 223 for receiving the locking pin 225 is provided in each side rail 221. The curved groove 223 has a first end 223A for latching the deployment mechanism 212 in a deployed position in which the wheels 18 are in contact with the ground surface G and a second end 223B for latching in a retracted position in which the wheels 18 are raised above the ground surface G. In the embodiment shown, the mechanism by which the deployment mechanism 212 is locked into the deployed or retracted position is very simple: the latching pin 225, once moved into the second end 223B, for example, does not release from this position until the crossbar 213 is lifted, thereby allowing the latching pin 225 to drop out of the latched position and move into the groove 223, along which it slides until it latches into the first end 223A. FIG. 11 is a side view of the side rail 221 and the wheel-mounting bracket 19 and illustrates the linkage between the side rail 221, the wheel-mounting bracket 19, and the kingpin 5A. A rail pin 36 connects the side rail 221 to the wheel-mounting bracket 19; a stub axle 34 is assembled in the wheel-mounting bracket 19 and rotatably supports the wheel 18; and the kingpin 5A is rotatably connected to the wheel-mounting bracket 19 by a bolt end 32.

Figure 12:
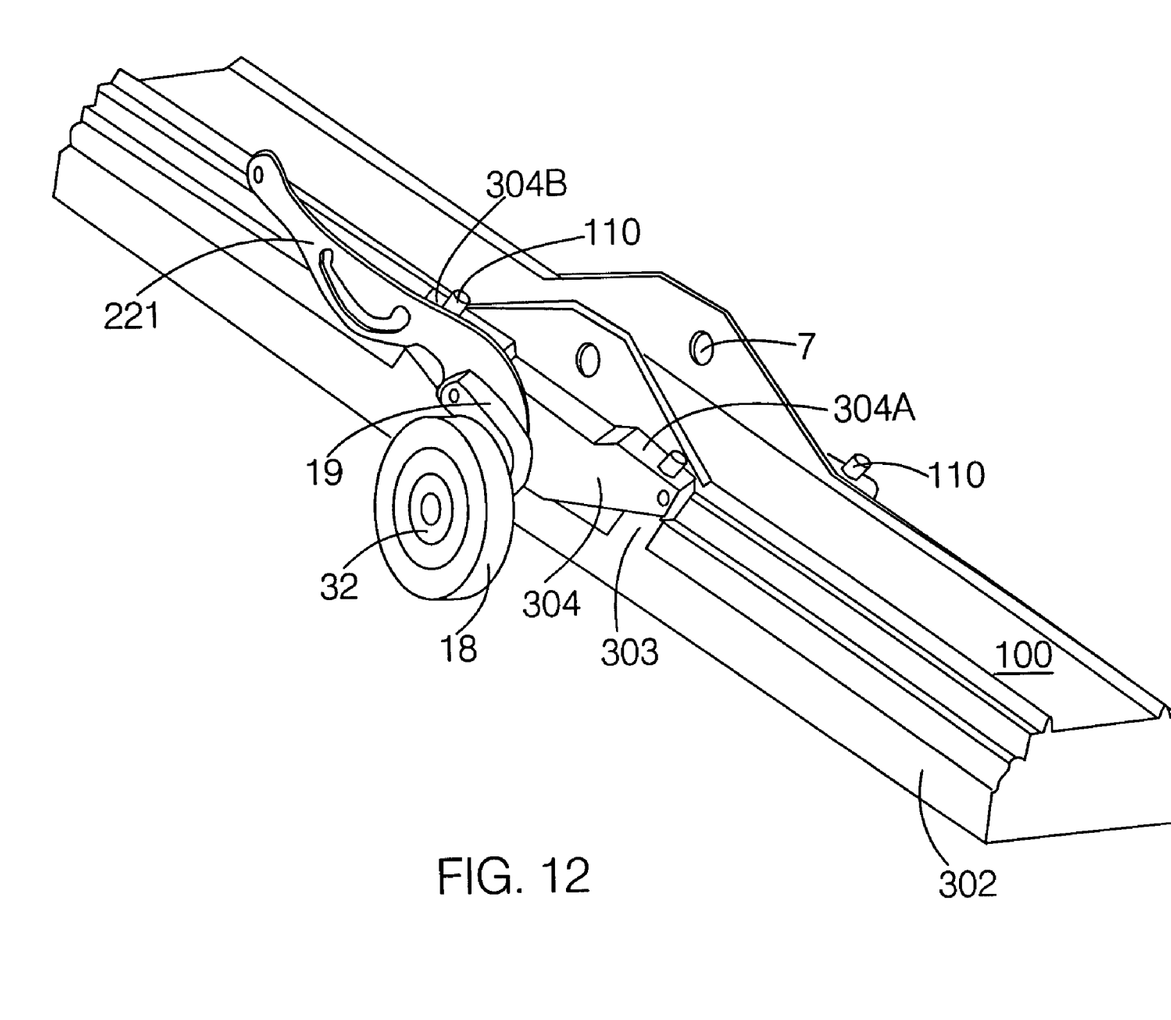
FIG. 12 is a perspective view of an alternative embodiment of the wheel unit according to the invention, showing a side-wall-mounted wheel unit mounted on a double-scag type ski.

FIG. 12 is an illustration of an alternative embodiment of the wheel unit according to the invention. A side-wall-mountable wheel unit 300 is mountable on the outside of the ski, rather than on the kingpin 5, and comprises a side-wall mounting bracket 304, the side rail 221 with the curved groove 223, previously shown in FIG. 9, the wheel-mounting bracket 21, the wheel-mounting spindle 21, and a latching pin 306. The alternative embodiment of the wheel unit according to the invention is particularly advantageous for use with the conventional double-scag ski 100 as shown in FIG. 12, or with skis without a suitable kingpin mounting. With the double-scag type ski 100, carbides are mounted on the runner surface of the ski 100 and are removably attached by means of threaded fasteners 110, such as bolts, as shown in FIG. 12. The double-scag ski 100 has contoured side walls 302 with carbide-fastener posts 303 integrated into the side wall construction. The carbide-fastener posts 303 have a bore for receiving the threaded fastener 110 that fastens the carbides to the runner of the ski 100. The side-wall mounting bracket 304 seats against the contour of the side wall 302 and is seated over the respective carbide fastener posts 303. The conventional threaded fastener 110 that is provided with the ski 100 to fasten the carbide is replaceable with a longer threaded fastener, if necessary, and is used to fasten the side-wall mounting bracket 304 as well as the carbide to the ski 100. A simple handle 311 may be used to deploy or retract the wheel unit 300, or an automated actuation means that is discussed below.

Figure 13:
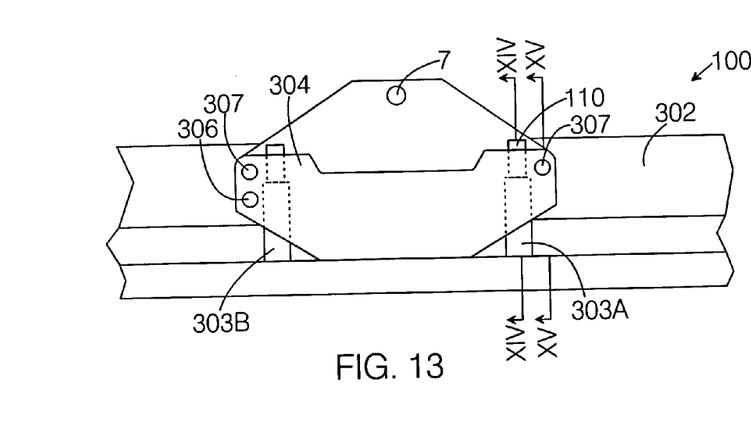
FIG. 13 is a side view of the side-wall mounting bracket, seated over the fasteners for fastening carbides to the double-scag type ski, and also showing the latching pin and the side-wall mounting holes for mounting the wheel unit directly to the side wall of the ski.

FIG. 13 is a side view of the side-wall mounting bracket 304 mounted on the side wall 302 of the ski 100. As seen, the side-wall mounting bracket 304 has a first mounting end 304A and a second mounting end 304B. Each of the mounting ends 304A/304B fits over a respective carbide-fastener post 303A/303B that extends upward from the side wall 302. The through-bores 110A in the carbide-fastener post 303A/B are indicated by dotted lines. These through-bores 110A serve simultaneously for attaching the side-wall mounting bracket 304 to the side wall 302. Additional mounting holes 307 for attaching the bracket 304 directly to the side wall 302 are also shown, as is the latching pin 306, one end of which is fixedly mounted on the side-wall mounting bracket 304 and the other end of which is captured in the curved groove 223 on the side rail 221 when the wheel unit 300 is assembled. The side-wall mountable wheel unit 300 is also mountable on a ski that does not provide the threaded fasteners 110. In such a case, the side-wall mounting bracket 304 is attached to the outer side wall 302 by means of suitable fasteners that are inserted through the mounting holes 307 and into bores that are provided in the side-wall 302. A deployment mechanism 312 for this alternative embodiment of the wheel unit 300 is similar to that described above and uses the same side rail 221. The latching pin 306 that extends from the side-wall mounting bracket 304 is captured in the curved groove 223 provided in the side rail 221.

Figure 14:
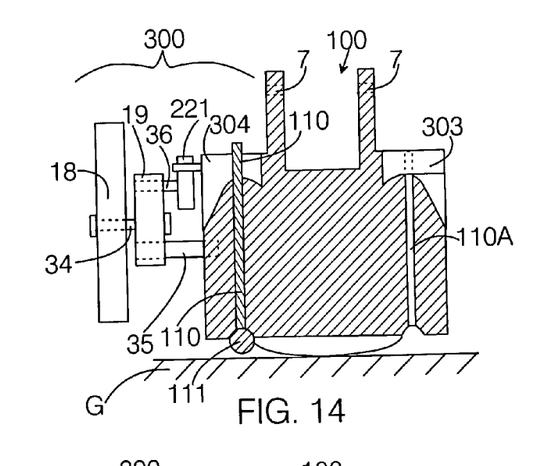
FIG. 14 is an end view of the double-scag type ski, showing the side-wall mountable wheel unit mounted on the side wall of the ski.

FIG. 14 is a partial cross-sectional end view of the double-scag type ski 100, showing the completely assembled wheel unit 300 fitted against the contoured side wall 302 of the ski 100 and mounted to the side wall by means of the carbide fastener 110. The wheel-mounting bracket 19 is pivotably mounted to the side wall by a bolt 35 that is fastened in a bore drilled directly into the sidewall 302. In this particular view, the wheel 18 is retracted.

Figure 15:
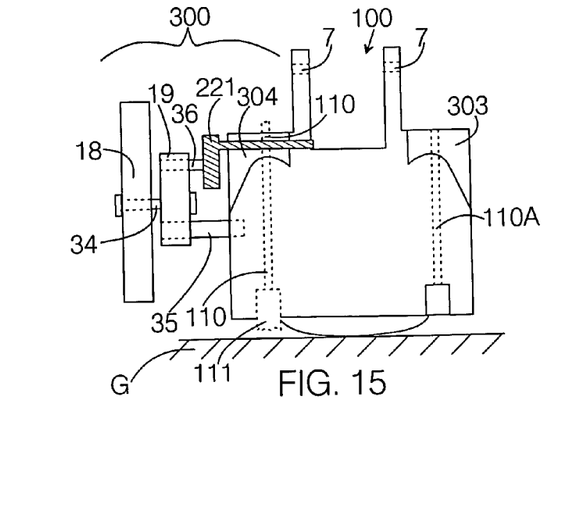
FIG. 15 is an end view of a ski, showing the side-wall mountable wheel unit mounted on the side wall of the ski.
Figure 16:
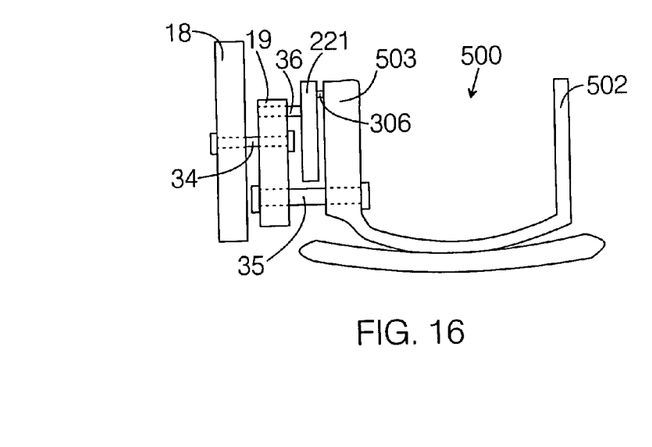
FIG. 16 is an end view of a ski, showing a mounting block for mounting the wheel unit according to the invention integrated into the form of the ski.
Figure 17:
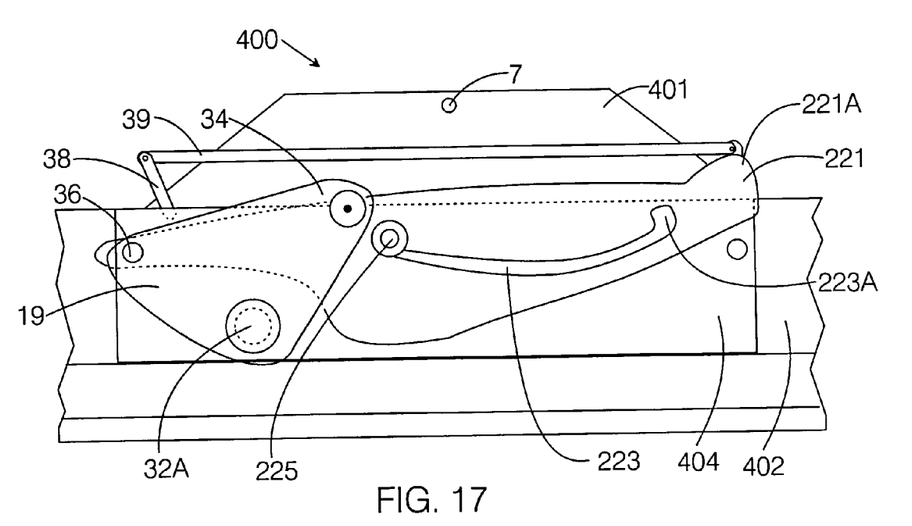
FIG. 17 is an illustration of a side-wall mountable wheel unit according to the invention, with a schematically illustrated automated actuating means mounted on the side-wall mounting bar and connected to the actuating end of the side rail.
Figure 18:
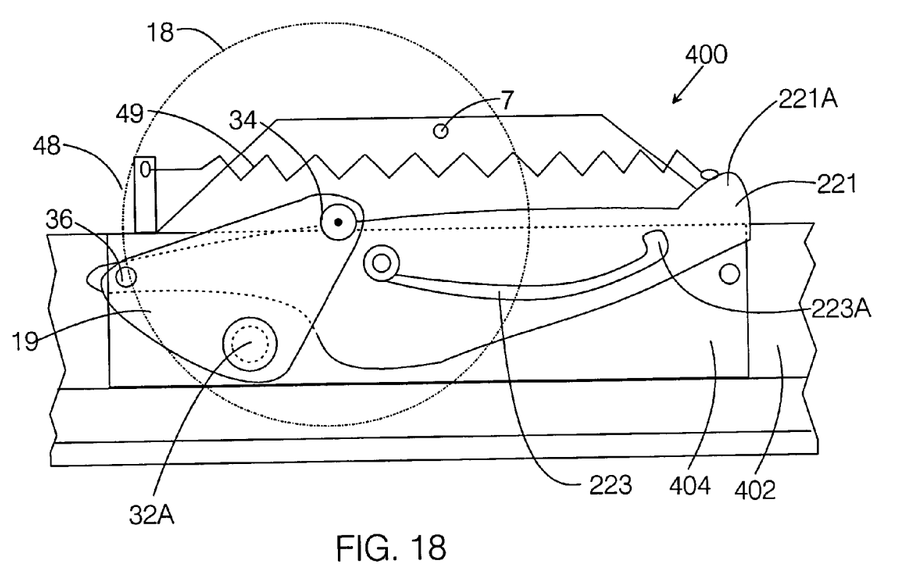
FIG. 18 is an illustration of a biasing spring as the automated actuating means of FIG. 17.

FIG. 15 is an end view of the double-scag type ski 100, showing the side-wall mounting bracket 304 seated against the contour of the side wall 302 and attached to the side wall 302 by means of threaded fasteners through mounting holes 307. This is an example of the versatility of the alternative embodiment of the wheel unit 300, which is mountable on the double-scag type ski 100 by means of the fasteners that are inserted and fastened in the through-bores 110A, or mountable directly onto the side wall 302 of the any ski that has a side wall by means of conventional fasteners that are inserted and fastened in the mounting holes 307. If bores are not provided in the sidewall 302 of the ski, they may easily be drilled into the sidewall 302 of the ski at the appropriate locations to receive the fasteners for the side-wall mounting bracket 304. Typically, threaded fasteners are used when mounting the wheel unit 300 according to the invention, although it is included with the scope of the invention that any suitable fastener be used to mount the wheel unit 300 to the ski 100.

The side-wall mounted wheel unit 300 is preferably mounted on the ski in the area of the kingpin mounting, as shown in FIGS. 12 and 13, because the section of ski where the kingpin is mounted is the balance point of the ski. The side-wall mounting bracket 304 shown in the illustrations is one that is adapted to seat over the carbide fastener posts 303. It should be understood that a side-wall mounting bracket for mounting the wheel unit on a ski that does not have the carbide fastener posts in the side walls may have a simpler construction that allows it to be mounted against the side-wall. In other words, it is not necessary that the side-wall mounting plate have mounting ends that seat over carbide fastener posts, but only that the side-wall mounting bracket 304 seat up against and be attachable to the sidewall.

FIG. 13 is a side view of the side-wall mounting bracket 304 mounted on the side wall 302 of the ski 100. As seen, the side-wall mounting bracket 304 has a first mounting end 304A and a second mounting end 304B. Each of the mounting ends 304A/304B fits over a respective carbide-fastener post 303A/303B that extends upward from the side wall 302. The through-bores 110A in the carbide-fastener post 303A/B are indicated by dotted lines. These through-bores 110A serve simultaneously for attaching the side-wall mounting bracket 304 to the side wall 302. Additional mounting holes 307 for attaching the bracket 304 directly to the side wall 302 are also shown, as is a latching pin 306, one end of which is fixedly mounted on the side-wall mounting bracket 304 and the other end of which is captured in the curved groove 223 on the side rail 221 when the wheel unit 300 is assembled. The side-wall mountable wheel unit 300 is also mountable on a ski that does not provide the threaded fasteners 110. In such a case, the side-wall mounting bracket 304 is attached to the outer side wall 302 by means of suitable fasteners that are inserted through the mounting holes 307 and into bores in the side-wall 302. A deployment mechanism 312 for this alternative embodiment of the wheel unit 300 is similar to that described above and uses the same side rail 212. The latching pin 306 that extends from the side-wall mounting bracket 304 is captured in the curved groove 223 provided in the side rail 221.

FIG. 14 is an end view of the double-scag type ski 100, showing the completely assembled wheel unit 300 fitted against the contoured side wall 302 of the ski 100 and mounted to the side wall by means of the carbide fastener 110. In this particular view, the wheel 18 is retracted.

FIG. 15 is an end view of the double-scag type ski 100, showing the side-wall mounting bracket 304 seated against the contour of the side wall 302 and attached to the side wall 302 by means of threaded fasteners through mounting holes 307. This is an example of the versatility of the alternative embodiment of the wheel unit 300, which is mountable on the double-scag type ski 100 by means of the fasteners that are inserted and fastened in the through-bores 110A, or mountable directly onto the side wall 302 of the any ski that has a side wall by means of fasteners that are inserted and fastened in the mounting holes 307. Typically, threaded fasteners are used when mounting the wheel unit 300 according to the invention, although it is included with the scope of the invention that any suitable fastener be used to mount the wheel unit 300 to the ski 100.

The side-wall mounted wheel unit 300 is preferably mounted on the ski in the area of the kingpin mounting, as shown in FIGS. 12 and 13, because the section of ski where the kingpin is mounted is the balance point of the ski. The side-wall mounting bracket 304 shown in the illustrations is one that is adapted to seat over the carbide fastener posts 303. It should be understood that a side-wall mounting bracket for mounting the wheel unit on a ski that does not have the carbide fastener posts in the side walls may have a simpler construction that allows it to be mounted against the side-wall. In other words, it is not necessary that the side-wall mounting plate have mounting ends that seat over carbide fastener posts.

A further advantage of the side-wall-mountable wheel unit 300 as shown in FIGS. 1–15 is that it is semi-permanently attachable to the particular ski. In other words, if so desired, it can be detached from the ski without impairing the ski. This is done simply by removing threaded fasteners, removing the complete wheel unit 300, and, if the wheel unit had been attached with the carbide fasteners 110 in the through-bores 110A, re-fastening the carbides.

Figure 19:
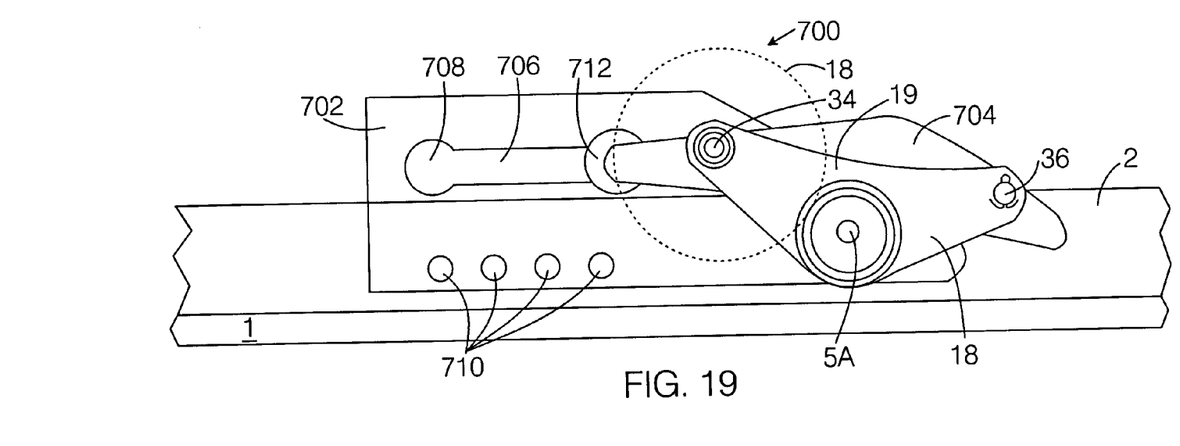
FIG. 19 is an elevational view of the universal wheel unit according to the invention, as seen on the outside of the ski.
Figure 20:
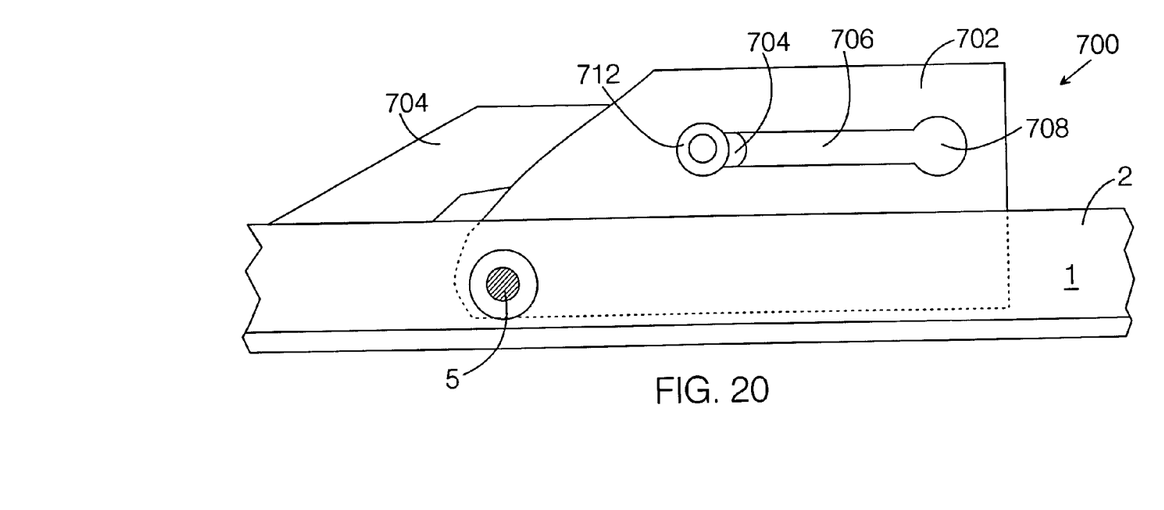
FIG. 20 is an elevational view of the universal wheel unit of FIG. 19, as seen on the inside of the ski.

FIG. 19 shows the universal wheel unit 700 as seen from the outside of a ski. The ski used in the illustration is the ski 1, which has a modified kingpin 5A. The universal rail 702 is mounted on the modified kingpin 5A, between the ski side 2 and the wheel-mounting bracket 19. The universal rail 702 is fixedly attached to the ski side 2 by means of suitable fasteners inserted through one or more of fastener bores 710. Suitable fasteners include threaded fasteners, rivets, bolts, etc. A first end of the latching device 704 is pivotably attached to the wheel-mounting bracket 19 by the rail pin 36 and a second end is attached to the locking handle 712, which is captured in a deployment and latching groove 706. The latching groove 706 has a first end and a second end, each of which is configured as a locking bore 708.

Figure 21:
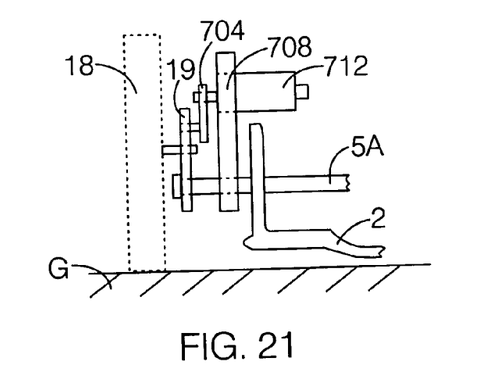
FIG. 21 is a frontal view of the universal wheel unit of FIG. 19, illustrating the linking of the wheel cam, the universal rail, and the latching mechanism.

The spring-loaded locking handle 712, best seen in FIG. 21, is assembled at the second end of the latching device 704. The locking handle 712 is dimensioned such that it snaps into the locking bore 708 when aligned with the bore. The handle 712, when pulled against the direction of the biasing spring force, slides along a pin away from the universal rail and allows the second end of the latching device 704 to be moved along the deployment and latching groove 706, in order to secure the handle 712 in the other locking bore 708. By locking the locking handle 712 in the first locking bore 708, the universal wheel unit 700 is secured in the deployed position, in which the wheel 18 supports the weight of the snowmobile, and by locking the handle 712 in the second locking bore, the universal wheel unit 700 is secured in the retracted position.

In many of the illustrations, the particular ski is shown with the side-wall mounted wheel unit 300 mounted on only one side of the ski. It should be understood that the invention also encompasses mounting a wheel unit 300 on each side of the ski. In such a case, it may be desirable to modify the deployment mechanism 312 by providing a crossbar that gangs the two ends of the side rails 221 together, similar to the crossbar 213 shown above on deployment mechanism 212, so that the wheels 18 are simultaneously deployed or retracted when the crossbar is moved.

FIGS. 19–23 illustrate a universal wheel unit 700 according to the invention. The universal wheel unit 700 is a single-wheel unit that is mountable on virtually any conventional ski, with or without a kingpin. It comprises the wheel-mounting bracket 19 as described above, and a deployment and latching mechanism that includes a universal rail 702 and a latching device 704 with a spring-biased locking handle 712.

FIG. 19 shows the universal wheel unit 700 as seen from the outside of a ski. The ski used in the illustration is the ski 1, which has a modified kingpin 5A. The universal rail 702 is mounted on the modified kingpin 5A, between the ski side 2 and the wheel-mounting bracket 19. The universal rail 702 is fixedly attached to the ski side 2 by means of suitable fasteners inserted through one or more of fastener bores 710. Suitable fasteners include threaded fasteners, rivets, bolts, etc. A first end of the latching device 704 is pivotably attached to the wheel-mounting bracket 19 by the rail pin 36 and a second end is captured in a deployment and latching groove 706. The latching groove 706 has a first end and a second end, each of which is configured as a locking bore 708.

A spring-loaded locking handle 712, best seen in FIG. 21, is assembled at the second end of the latching device 704. The locking handle 712 is dimensioned such that it snaps into the locking bore 708 when aligned with the bore. The handle 712, when pulled against the direction of the biasing spring force, slides along a pin away from the universal rail and allows the second end of the latching device 704 to be moved along the deployment and latching groove 706, in order to secure the handle 712 in the other locking bore 708. By locking the locking handle 712 in the first locking bore 708, the universal wheel unit 700 is secured in the deployed position, in which the wheel 18 supports the weight of the snowmobile, and by locking the handle 712 in the second locking bore, the universal wheel unit 700 is secured in the retracted position.

Figure 22:
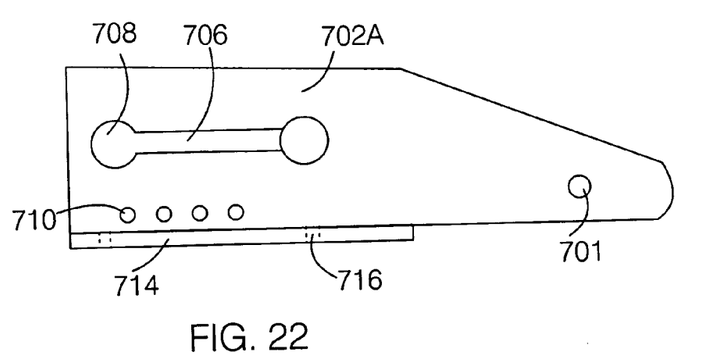
FIG. 22 is a detail view of the modified universal rail for mounting on ski scag posts.
Figure 23:
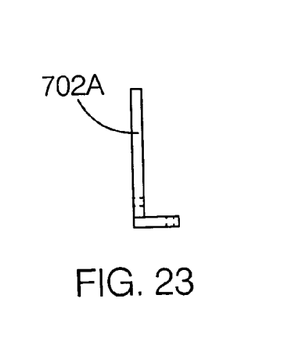
FIG. 23 is a side view of the modified universal rail of FIG. 22.

FIGS. 22 and 23 show a modified universal rail 702A that is adapted to mount the universal wheel unit 700 on double-scag type ski 100. As shown, a scag-post adapter bar 714 is attached or integrally formed with the universal rail 702. Bore holes 716 for receiving scag fasteners 110 are provided in the scag-post mounting bar 704. This adapter bar 714 allows the modified universal rail 702A to be mounted over the scag posts of the ski type shown in FIGS. 13–15. The bores 716 are spaced apart to receive the scag fasteners 110 of the conventional side wall ski 100.

Figure 24:
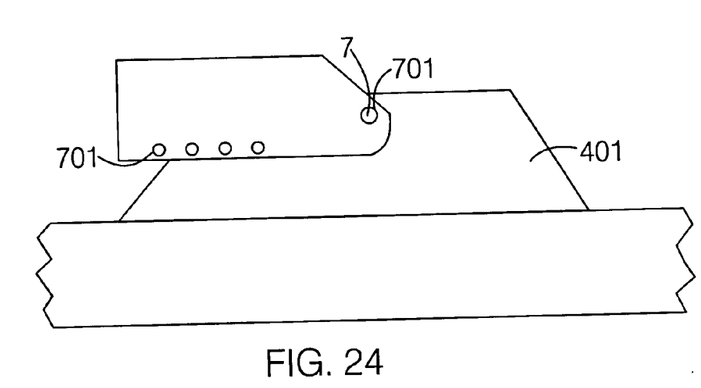
FIG. 24 shows the universal rail mounted on the saddle of a conventional ski.

FIG. 24 is an illustration of a method of mounting the universal wheel unit 700 on the ski 400 that has a saddle 401. The kingpin mounting hole 701 on the universal rail 702 is aligned with the kingping-mounting hole 7 on the saddle 401. This assures that the universal wheel unit 700 is mounted at the balance point of the ski. The universal rail 702 is then fastened to the saddle 401 by drilling one or more holes in the saddle 401 such that they align with the corresponding fastener bores 710 on the universal rail 702 and rigidly and securely fastening the universal rail 702 to the saddle with suitable fasteners.

Figure 25A:
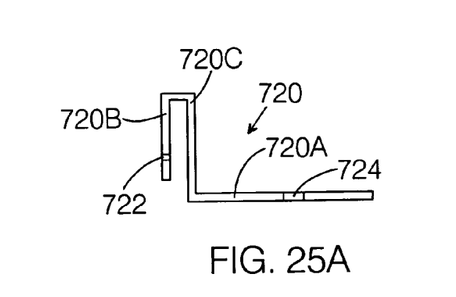
FIG. 25A is a frontal elevational view of a ski-floor mounting bracket for use with the universal rail wheel unit.
Figure 25B:
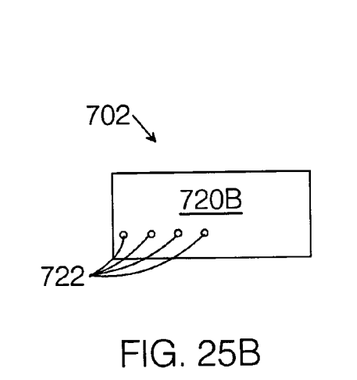
FIG. 25B is a side elevational view of the ski-floor mounting bracket of FIG. 25A.
Figure 25C:
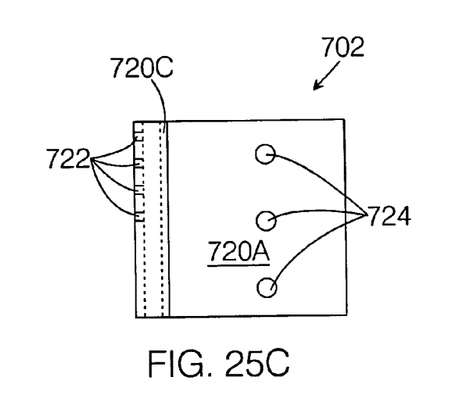
FIG. 25C is a plan view of the ski-floor mounting bracket of FIG. 25A.
Figure 26:
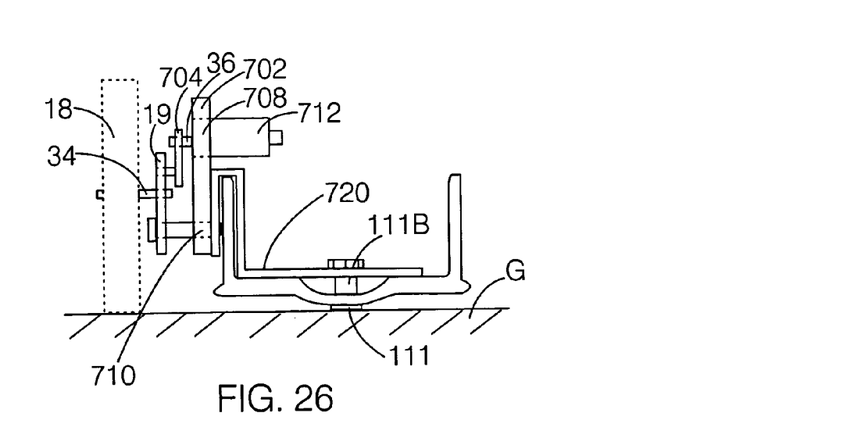
FIG. 26 illustrates the ski-floor mounting bracket of FIG. 25A, mounted on a conventional ski, with the universal wheel unit attached to the mounting section.

FIGS. 25A–26 illustrate a ski-floor mounting bracket 720 that attaches to the bottom of the ski 1 with a carbide-runner fastener 111B that simultaneously fastens the carbide runner 111 to the ski 1. This ski-floor mounting bracket 720 attaches securely to the ski 1 and provides a means of attaching the universal wheel unit 700 to the ski 1. On some skis, the carbide runner 111 is attached to the outer surface of the bottom of the ski 1 by the carbide-runner fastener 111B that passes through a bore in the bottom of the ski 1. Typically, a plurality of bores are provided in the bottom of the ski 1 and a corresponding plurality of carbide-runner fasteners 111B are used to attach the carbide runner 111 to the ski 1. In the embodiment shown, the ski-floor mounting bracket 720 has a base plate 720A, plus a mounting section 720B that extends along the outside of the sidewall, and an intermediate section 720C that accommodates the contour of the side wall 100 and connects the base plate 720A to the mounting section 720B. The base plate 720A has one or more fastener bores 724 that are dimensioned to receive the carbide-runner fastener 111B. As seen in FIGS. 25A and 25B, the mounting section 720B has a series of bolt holes 722. These bolt holes 722 are spaced apart such that they align with the bores 710 on the universal rail 702. The universal wheel unit 700 is attachable to the ski-floor mounting bracket 720 by fastening the base plate 720A to the inner surface of the bottom of the ski 1 and inserting and affixing suitable fasteners through the bores 710 on the universal rail 702 and corresponding bolt holes 722. Typically, the fasteners 111B are spaced three inches apart. FIG. 25C shows the ski-floor mounting bracket 720 according to the invention having a series of bolt holes 722, spaced so as to align with the holes 710 provided on the universal rail 702.

Figure 27:
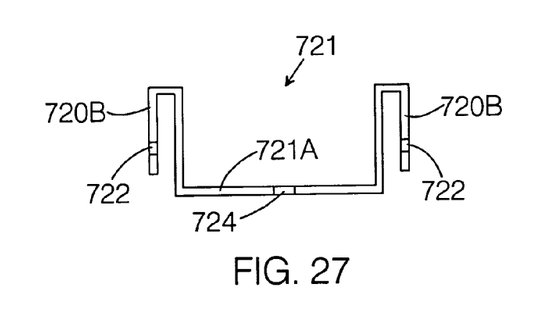
FIG. 27 illustrates the ski-floor mounting bracket having a mounting section on each side of the base plate.

FIG. 26 shows the ski-floor mounting bracket 720 mounted on the ski 1, with the universal wheel unit 700 attached to the mounting section 720B on one side of the ski 1 only. FIG. 27 shows a double-sided mounting bracket 721 according to the invention with a base plate 721A that extends across the floor of the ski 1 and a mounting section 720B that extends along the outside of each side-wall. This double-sided bracket 721 enables a wheel unit or other device to be mounted on each side of the ski 1.

Although the invention has been described with reference to several specific embodiments mentioned herein, these embodiments are merely illustrative of the present invention. It should be understood that numerous variations in construction of the present invention may be contemplated in view of the following claims, without straying from the intended scope and field of the invention herein disclosed.

What is claimed is:

1. A mounting bracket for mounting on a ski of a conventional snowmobile said ski, having a snowmobile steering element mounted on a kingpin and a vertical carbide-stud post fastener in a sidewall of said ski, said mounting bracket comprising a base plate and a mounting section extending from said base plate;

wherein said base plate is anchorable to an inner surface of a bottom of said ski and said mounting section is anchorable to said sidewall by means of said vertical carbide-stud post fastener, said mounting section having means for mounting a device.

2. The mounting bracket of claim 1, wherein said ski has a carbide-runner affixed to an outer surface of said bottom of said ski by means of a carbide-runner fastener that extends through a bore in said bottom of said ski, and wherein said base plate has a fastener-bore that aligns with said bore in said bottom of said ski, said carbide-runner fastener being receivable through said bore and said fastener-bore, so as to affix said carbide-runner and said base plate to said bottom of said ski.

3. The mounting bracket of claim 2, wherein said bore in said bottom of said ski includes multiple bores and wherein said base plate has a plurality of bores, at least two of which align with a corresponding number of said multiple bores.

4. The mounting bracket of claim 1, wherein said mounting section includes a right mounting section and a left mounting section.

5. The mounting bracket of claim 1, wherein said mounting section includes a cantilevered section that extends over a top surface of said sidewall.

6. The mounting bracket of claim 1, wherein said mounting section includes a vertical mounting surface that extends downward from said cantilevered section, alongside an outer surface of said sidewall.

7. The mounting bracket of claim 1, wherein said device is a wheel unit and said means for mounting said wheel unit is a mounting bore in said mounting section.

8. A mounting bracket for mounting on a ski of a conventional snowmobile, said ski having a bottom with a carbide stud fastened by a fastener to an underside of said bottom, and a sidewall, wherein said mounting bracket has a base plate that is anchorable to an inner surface of said bottom of said ski by said fastener, and a mounting section that extends across an upper surface of said sidewall and is anchorable to said sidewall by means of a vertical fastener through said sidewall.

9. The mounting bracket of claim 8, wherein said ski has a first sidewall and a second side wall and said mounting section includes a first mounting section that extends along said first sidewall and a second mounting section that extends along said second sidewall.

* * * * *